United States Patent
Chowdhury et al.

(10) Patent No.: US 6,556,732 B1
(45) Date of Patent: Apr. 29, 2003

(54) ALL FIBER POLARIZATION MODE DISPERSION COMPENSATOR

(75) Inventors: Dipakbin Q. Chowdhury, Corning, NY (US); Edward F. Murphy, Painted Post, NY (US); Razvigor B. Ossikovski, Villebon-sur-Yvette (FR); Donald J. Sobiski, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/589,423

(22) Filed: Jun. 7, 2000

(51) Int. Cl.7 .................................................. G02B 6/00
(52) U.S. Cl. ............................ 385/11; 385/96; 359/156
(58) Field of Search ............................... 385/3, 8.9, 11, 385/95, 96; 359/156, 161

(56) References Cited

U.S. PATENT DOCUMENTS

| | | | |
|---|---|---|---|
| 4,478,489 A | 10/1984 | Blankenship et al. | |
| 4,529,262 A | 7/1985 | Ashkin et al. | |
| 4,572,608 A | 2/1986 | Mochizuki et al. | |
| 4,729,620 A | 3/1988 | Pavlath | |
| 4,729,622 A | 3/1988 | Pavlath | |
| 4,750,833 A | 6/1988 | Jones | |
| 4,753,507 A | 6/1988 | DePaula et al. | |
| 4,768,851 A | 9/1988 | Shaw et al. | |
| 4,768,853 A | 9/1988 | Bhagavatula | |
| 4,801,189 A | 1/1989 | Shaw et al. | |
| 4,923,290 A | * 5/1990 | Brinkmeyer et al. ......... | 385/11 |
| 4,966,431 A | 10/1990 | Heismann | |
| 4,969,710 A | 11/1990 | Tick et al. | |
| 4,988,169 A | 1/1991 | Walker | |
| 5,212,743 A | 5/1993 | Heismann | |

(List continued on next page.)

FOREIGN PATENT DOCUMENTS

| | | |
|---|---|---|
| DE | 198 18 699 A1 | 4/1998 |
| EP | 0 566 800 B1 | 11/1992 |
| EP | 0 905 532 A2 | 9/1998 |

(List continued on next page.)

OTHER PUBLICATIONS

Girard, André, et al.; *PDM: The New Telecommunication Frontier Emerges*; Lasers and Optronics; Feb. 1997; pp. 23–25.

(List continued on next page.)

*Primary Examiner*—Rodney Bovernick
*Assistant Examiner*—Juliana K. Kang
(74) *Attorney, Agent, or Firm*—Philip G. Alden

(57) ABSTRACT

A polarization mode dispersion compensator corrects polarization mode dispersion in an optical signal having a fast polarization mode component, a slow polarization mode component and a time differential between the components. The compensator includes a phase shifter and a variable delay section. An input of the phase shifter is coupled to an optical device that provides an optical signal that exhibits polarization mode dispersion. The phase shifter functions to rotate the optical signal principal states of polarization to a desired orientation. The variable delay section includes an input, an output and at least one optical fiber delay line. The input of the variable delay section is coupled to the output of the phase shifter and the desired orientation of the optical signal principal states of polarization are substantially rotated to be in alignment with one of a fast axis and a slow axis of each of the one or more fiber delay lines. In this manner, the variable delay section functions to delay the principal states of polarization of the optical signal with respect to one another as a function of whether the principal states of polarization traverse said one of a fast axis and a slow axis of the at least one optical fiber delay line, thus reducing the time differential between the components.

3 Claims, 4 Drawing Sheets

U.S. PATENT DOCUMENTS

| | | |
|---|---|---|
| 5,298,047 A | 3/1994 | Hart, Jr. et al. |
| 5,311,346 A | 5/1994 | Haas et al. |
| 5,319,477 A | 6/1994 | DeJule et al. |
| 5,357,359 A | 10/1994 | Uchiyama et al. |
| 5,361,319 A | 11/1994 | Antos et al. |
| 5,404,413 A | 4/1995 | Delavaux et al. |
| 5,418,881 A | 5/1995 | Hart, Jr. et al. |
| 5,440,414 A | 8/1995 | Kersey et al. |
| 5,440,659 A | 8/1995 | Bergano et al. |
| 5,473,457 A | 12/1995 | Ono |
| 5,483,612 A | 1/1996 | Gallagher et al. |
| 5,491,576 A | 2/1996 | Bergano |
| 5,553,185 A | 9/1996 | Antos et al. |
| 5,561,726 A | 10/1996 | Yao |
| 5,587,827 A * | 12/1996 | Hakimi et al. ............... 359/249 |
| 5,596,448 A | 1/1997 | Onaka et al. |
| 5,600,738 A | 2/1997 | Bergland et al. |
| 5,613,027 A | 3/1997 | Bhagavatula |
| 5,613,028 A | 3/1997 | Antos et al. |
| 5,649,044 A | 7/1997 | Bhagavatula |
| 5,659,412 A | 8/1997 | Hakki |
| 5,712,704 A | 1/1998 | Martin et al. |
| 5,748,824 A | 5/1998 | Smith |
| 5,778,128 A | 7/1998 | Wildeman |
| 5,793,511 A | 8/1998 | Bülow |
| 5,796,510 A | 8/1998 | Yao |
| 5,802,235 A | 9/1998 | Akasaka |
| 5,822,100 A | 10/1998 | Robinson et al. |
| 5,838,867 A | 11/1998 | Onishi et al. |
| 5,859,939 A | 1/1999 | Fee et al. |
| 5,864,421 A | 1/1999 | Suzuki et al. |
| 5,867,616 A | 2/1999 | Antos et al. |
| 5,887,105 A | 3/1999 | Bhagavatula et al. |
| 5,894,537 A | 4/1999 | Berkey et al. |
| 5,897,680 A | 4/1999 | Geertman |
| 5,903,684 A | 5/1999 | Payton |
| 5,978,125 A | 11/1999 | Yao |
| 5,986,784 A | 11/1999 | Kersey et al. |
| 6,011,253 A | 1/2000 | Hakki |
| 6,188,809 B1 | 2/2001 | Bismuth et al. |
| 6,233,371 B1 * | 5/2001 | Kim et al. .................... 385/11 |
| 6,417,948 B1 * | 7/2002 | Chowdhury et al. ........ 359/161 |

FOREIGN PATENT DOCUMENTS

| | | |
|---|---|---|
| EP | 0 909 045 A2 | 9/1998 |
| WO | WO 96/23739 | 1/1996 |
| WO | WO 97/50185 | 6/1997 |
| WO | WO 98/37645 | 2/1998 |
| WO | WO 99/53363 | 4/1999 |
| WO | WO 00/03505 | 6/1999 |
| WO | WO 00/03506 | 7/1999 |
| WO | WO 00/13056 | 8/1999 |
| WO | WO 00/36459 | 12/1999 |
| WO | WO 00/41344 | 12/1999 |
| WO | WO 00/45531 | 12/1999 |

OTHER PUBLICATIONS

Poole, Craig D., et al.; *Polarization Effects in Lightwave Systems*; Optical Fiber Telecommunications; vol. IIIA; 1997.

Corning Document; *Corning Fiber News & Views: What is PMD?*; Sep. 24, 1998; pp. 1–2.

Alcatel; *Cables & Components: Technical Papers: Polarization Mode Dispersion (PMD)*; May 1, 2000; pp. 1–5.

Fiber Optics News; *Fiber Products*; Mar. 8, 1999; p. 7.

* cited by examiner

ALL FIBER POLARIZATION MODE DISPERSION COMPENSATOR

BACKGROUND OF THE INVENTION

1. Field of the Invention

The present invention is generally directed to an optical fiber, and more particularly to a polarization mode dispersion (PMD) compensator for a single-mode optical fiber.

2. Technical Background

Polarization mode dispersion (PMD) in single-mode optical fibers is a recognized source of bit errors in high-speed optical communication systems. PMD may cause optical pulse broadening, or pulse deformation in general, and as such, limit the bit rate that can be achieved with a given optical communication system that does not compensate for the PMD. As pulses broaden, eventually the individual bits are no longer distinguishable and the communication system ceases to properly function.

PMD in single-mode optical fibers has been explained through a model which divides a given light pulse into a signal with two principal states of polarization (PSP). The pulse broadening of a transferred optical signal, induced by first-order PMD, is caused by the propagation time difference between the input pulses projected onto each of the two orthogonal polarization axes (i.e., the PSP) in a single span of single-mode optical fiber or onto the PSP of interconnected single-mode optical fibers. The propagation time difference, known as differential group delay (DGD), is usually expressed in units of picoseconds per square root kilometer for single spans of single-mode optical fiber and for interconnected single-mode optical fibers.

As is well known to one of ordinary skill in the art, first-order PMD is typically caused by a characteristic of optical fibers known as birefringence. Birefringence occurs when an optical fiber has different indices of refraction, with respect to a set of axes defined within the fiber. For example, when light travels along the length of the fiber (e.g., along the Z axis of a Cartesian coordinate system), the two principal states of polarization are orthogonal to each other and to the length of the fiber (e.g., projected along the X and Y axes). The indices of refraction measured with respect to the X and Y axes typically exhibit slight differences due to the geometrical properties of the fiber and/or environmental effects.

Many geometrical deviations of an optical fiber can be attributed to the optical fiber manufacturing process, which typically yields fibers that are not perfectly round. Environmental effects, such as applied stress, can alter the index of refraction in the region of the stress and cause the birefringence of the fiber to change. The change in birefringence with the application of stress has been extensively studied in the field of stress optics. When the amount of stress, the type of stress and the stress properties of a given optical fiber are known, the amount of change in birefringence can generally be accurately calculated. The fiber axis with the higher index of refraction is known as the 'slow axis'. The fiber axis with the lower index of refraction is known as the 'fast axis'. The terms 'fast axis' and 'slow axis' refer to the relative speed of light propagation along the orthogonal axes. As is well known to one of ordinary skill in the art, a change in birefringence, as a function of applied stress, is typically greatest when the stress is applied transverse to either the fast or slow axis of an optical fiber.

Several techniques for changing the birefringence of an optical fiber are known. For example, the birefringence of an optical fiber can be changed by applying an axial strain (pulling) or applying a transverse stress to the fiber, with a piezoelectric actuator or an electromagnetic fiber squeezer. However, pulling on a fiber is subject to mechanical limitations that include breakage and coating delamination and therefore is somewhat less desirable than applying a transverse stress. As compared to a piezoelectric actuator, a typical electromagnetic fiber squeezer is slow, uses more power and is noisier (i.e., is a noise source in the electromagnetic spectrum).

A variety of arrangements have been proposed as potential PMD compensators for optical fibers. The different PMD compensators can generally be classified according to how polarization transformation and compensation is accomplished. For example, polarization transformation has been achieved by mechanical rotating elements, liquid crystals and fiber squeezers. As is well known to one of ordinary skill in the art, squeezing an optical fiber induces a stress birefringence, which can be utilized to control polarization. Current PMD compensator designs utilize optical or optoelectronic birefringent elements that permit the delay of one polarization state with respect to the other. While certain experimental PMD compensators have been demonstrated, no practical PMD compensators, which adequately compensate for first-order PMD in optical fibers, are commercially available.

As such, a practical device which compensates for first-order polarization mode dispersion in a single-mode optical fiber, is desirable.

SUMMARY OF THE INVENTION

The present invention is directed to a polarization mode dispersion compensator for correcting polarization mode dispersion in an optical signal having a fast polarization mode component, a slow polarization mode component and a time differential between the components. The compensator includes a phase shifter and a variable delay section. An input of the phase shifter is coupled to an optical device that provides an optical signal that exhibits polarization mode dispersion. The phase shifter functions to rotate the optical signal principal states of polarization to a desired orientation. The variable delay section includes an input, an output and at least one optical fiber delay line. The input of the variable delay section is coupled to the output of the phase shifter and the desired orientation of the optical signal principal states of polarization are substantially rotated to be in alignment with one of a fast axis and a slow axis of each of the one or more fiber delay lines. In this manner, the variable delay section functions to delay the principal states of polarization of the optical signal with respect to one another as a function of whether the principal states of polarization traverse said one of a fast and a slow axis of a given optical fiber delay line, thus reducing the time differential between them.

A PMD compensator, according to the present invention, is relatively easy to manufacture and provides a low loss, low cost and highly reliable practical solution to PMD.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

An embodiment of the present invention is generally directed to an all fiber polarization mode dispersion (PMD) compensator that preferably utilizes polarization-maintaining (PM) optical fibers in conjunction with mechanical squeezers (e.g., piezoelectric actuators) to compensate for first-order PMD in single-mode optical fibers. When implemented in conjunction with an appropriate real-time detection and feedback control system (FIG. 4), a PMD compensator, according to the present invention, provides a practical solution to first-order PMD in high-speed optical fiber communication systems. A phase shifter (PS), according to the present invention, can also serve as a polarization scrambler, which is useful for testing optical components to characterize the polarization dependent losses (PDLs) or other polarization dependent effects. One of ordinary skill in the art will appreciate that a polarization scrambler can utilize regular optical fiber or PM optical fiber.

Figure 1:
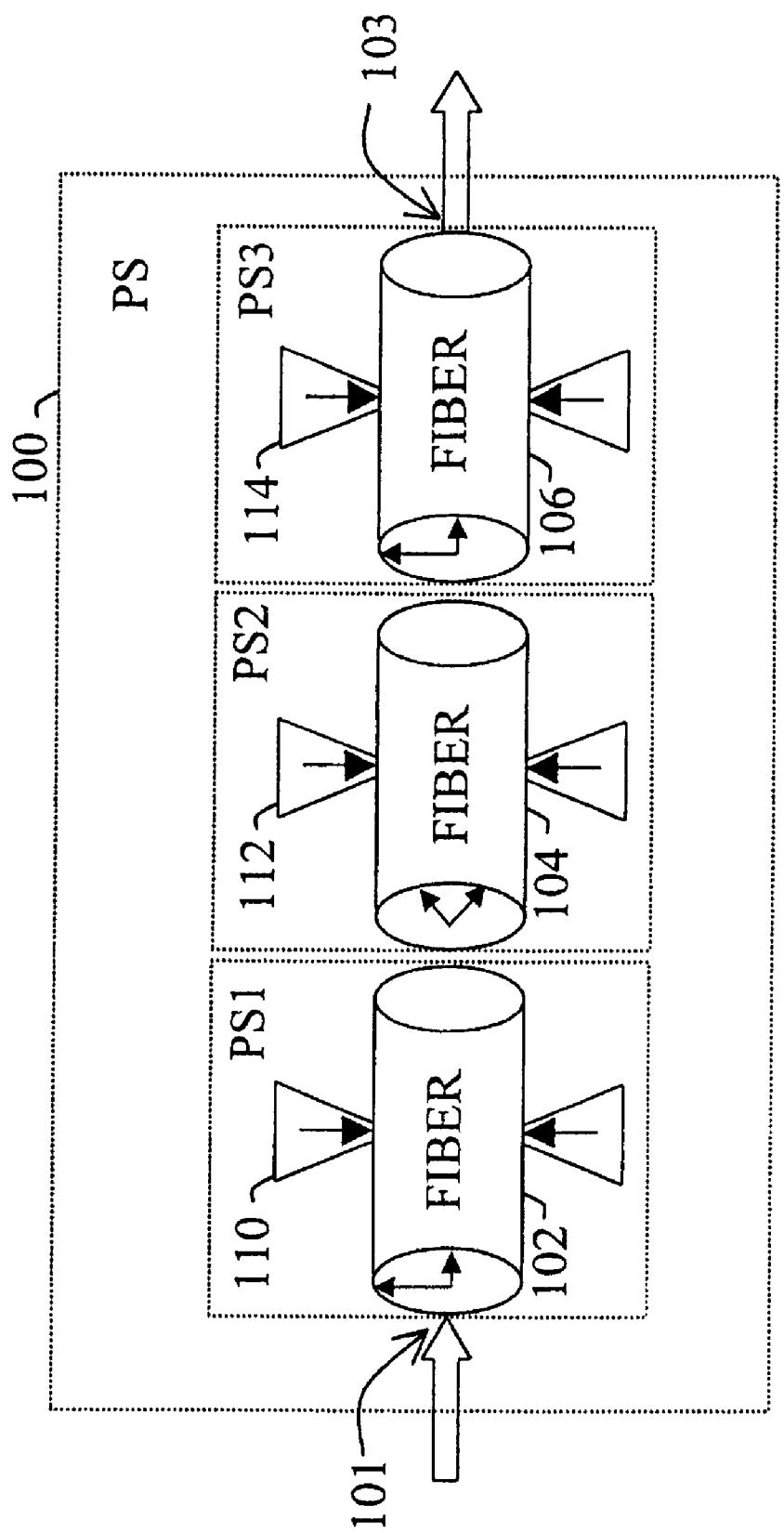
FIG. 1 is a block diagram of a phase shifter (PS) included within a polarization mode dispersion (PMD) compensator, constructed according to an embodiment of the present invention.

As is illustrated in FIG. 1, PS 100 preferably includes three mechanically squeezed PM optical fibers 102, 104 and 106 that are coupled (e.g., fusion spliced using commercially available splicers) in series and acted upon by three mechanical squeezers 110, 112 and 114, respectively. Preferably, mechanical squeezers 110, 112 and 114 are piezoelectric actuators that have a response time typically much less than one millisecond. Before joining the fibers 102, 104 and 106, it is normally desirable to recoat the fibers 102, 104 and 106 with a material (e.g., a metal or polymer) such that the fibers 102, 104 and 106 can withstand the mechanical stress applied to them over the lifetime (e.g., up to twenty years) of the PMD compensator. The fast axes of each fiber 102, 104 and 106 are mechanically oriented at zero, forty-five and zero degree azimuths, respectively. As used herein, the azimuth is defined as the angle that a fast axis of each fiber 102, 104 and 106 makes with the Y axis, after a mechanical rotation about the Z axis.

In a preferred embodiment, PS 100 includes three PSs: PS1, which includes fiber 102 and mechanical squeezer 110; PS2, which includes fiber 104 and mechanical squeezer 112; and PS3, which includes fiber 106 and mechanical squeezer 114. As previously stated, PS 100 can also function as a polarization scrambler, depending on the particular strategy used to activate mechanical squeezers 110, 112 and 114. One of ordinary skill in the art will appreciate that mechanically aligning PS2 at an angle of forty-five degrees with respect to PS1 provides ninety degrees of light phase difference between PS1 and PS2. Since PS1 and PS2 are orthogonal with respect to a light signal, the combination of PS1 and PS2 can reach any point on a Poincaré sphere. One of ordinary skill in the art will appreciate that if PS1 and PS2 are not mechanically aligned at forty-five degrees, only a subset of polarization states can be reached on a Poincaré sphere.

Figure 2:
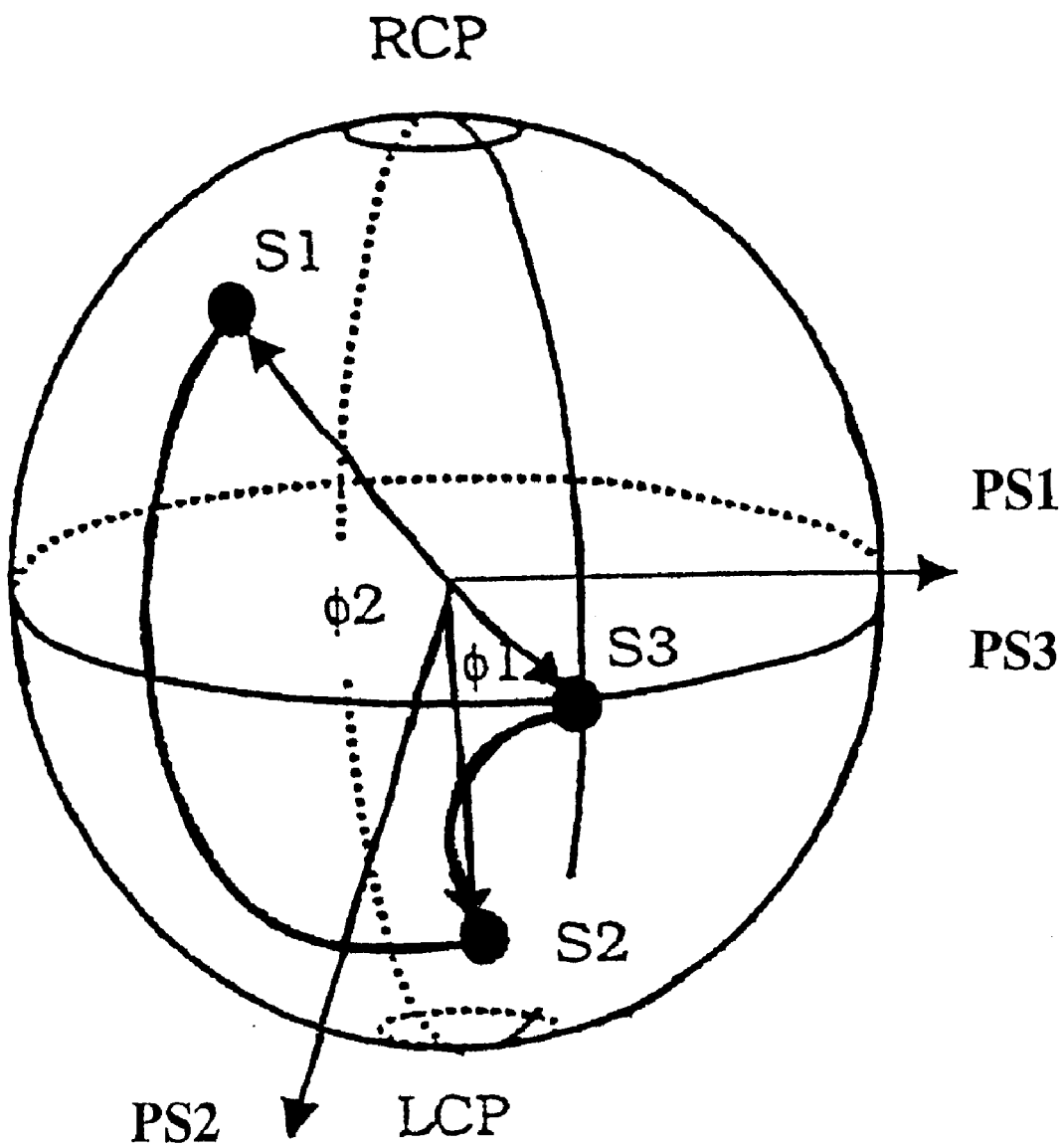
FIG. 2 is a Poincaré sphere illustrating the operation of the PS of FIG. 1.

FIG. 2 shows a Poincaré sphere that optically represents PS1, PS2 and PS3 with axes lying along an equatorial plane of the Poincaré sphere. PS2 is at right angles to PS1 and PS3. The amount of phase retardation between the fast and slow axis of PS1, PS2 and PS3 can be varied between zero degrees and three-hundred sixty degrees on the Poincaré sphere by varying the magnitude of the mechanical stress, applied by an associated mechanical squeezer. One of ordinary skill in the art will appreciate that only PS1 and PS2 are required to reach any point on the Poincaré sphere. However, PS3 can be advantageously utilized to solve various reset problems, typically associated with mechanical squeezer actuator windup and saturation.

The slow principal state of polarization of the optical signal to be PMD compensated, is denoted by polarization state 'S1' on the Poincaré sphere. The arbitrary input state is first rotated by an angle of $\phi 2$ (by PS2), about the PS2 axis, until it reaches state 'S2'. The resultant state 'S2' is then rotated by an angle of $\phi 1$ (by PS1), about the PS1 axis, until it coincides with the vertical state 'S3'. In this manner, an arbitrary input principal state of polarization 'S1' is aligned with the input of variable delay section (VDS) 300. VDS 300, whose fast axis is aligned with the 'S3' state, generates a variable delay between the slow and fast axis, which is approximately equal to the DGD of the input optical signal. In this manner, compensation is achieved by aligning the slow PSP of the input optical signal with the fast axis of one or more of the delay lines (e.g., DL1, DL2 and DL3) of VDS 300 such that the delay provided by VDS 300 substantially matches the PMD delay of an input optical signal.

Figure 3:
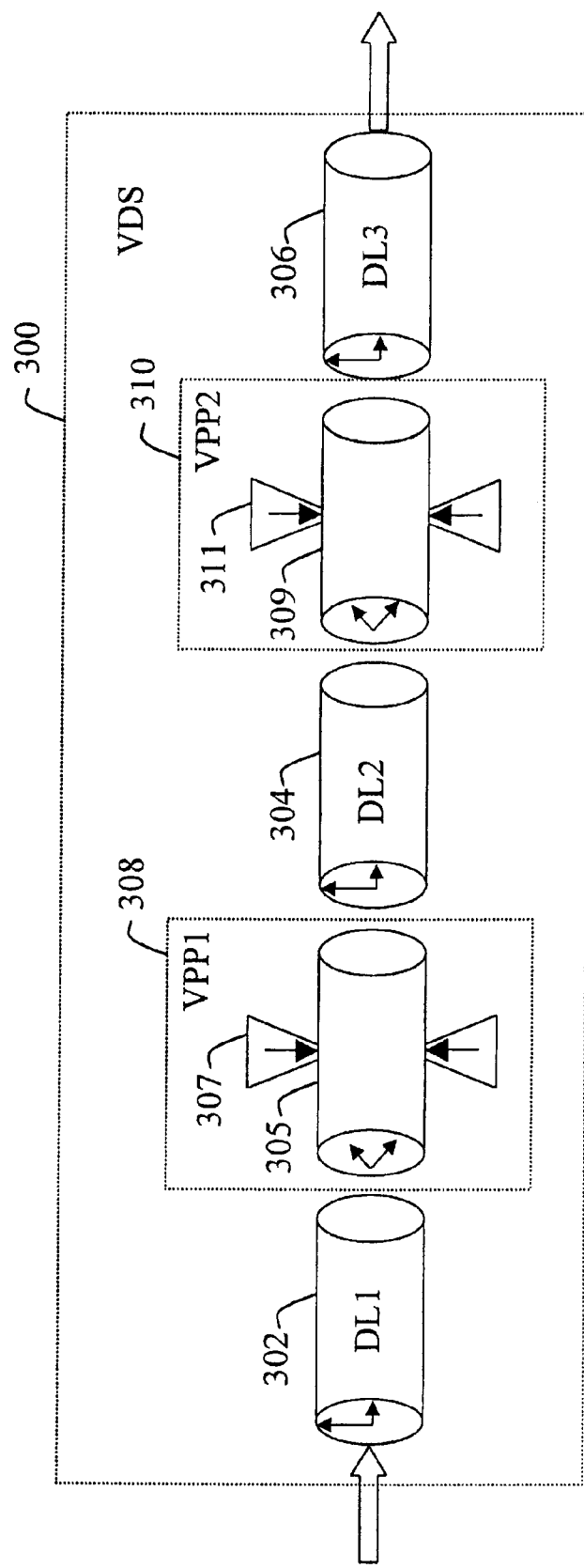
FIG. 3 is a block diagram of a variable delay section (VDS) that includes three delay lines (DL1, DL2 and DL3) and two variable phase plates (VPP1 and VPP2) included within a PMD compensator, constructed according to an embodiment of the present invention.

As shown in FIG. 3, the portion of the PMD compensator 402 (FIG. 4) that allows the polarization states to be adjusted, with respect to one another, is the variable delay section (VDS) 300. A VDS includes one or more sections of polarization-maintaining (PM) optical fiber that serve as a delay line. VDS 300, of FIG. 3, has three delay lines 302, 304 and 306 (DL1, DL2 and DL3) that represent a fixed amount of total delay, which allows VDS 300 to compensate for a maximum amount of differential group delay (DGD) equal to the combination of delay associated with delay lines 302, 304 and 306. One of ordinary skill in the art will appreciate that any combination of delay lines can be utilized to achieve a desired total delay. For example, each delay line could add the same delay or add delays that are multiple of $2^N$ or of some other factor.

Each delay line is joined to another delay line by a short section of PM fiber that is acted upon by a mechanical squeezer. The combination of PM fiber and mechanical squeezer functions as a variable phase plate (VPP). In FIG. 3, delay line 302 is coupled to delay line 304 by VPP 308 (i.e., VPP1) and delay line 304 is joined to delay line 306 by VPP 310 (i.e., VPP2). VPP1 includes a PM optical fiber 305 that is squeezed by a mechanical squeezer 307. VPP2 includes a PM optical fiber 309 that is squeezed by a mechanical squeezer 311. Preferably, mechanical squeezers 307 and 311 are piezoelectric actuators that have a response time typically much less than one millisecond. In a preferred embodiment, fibers 305 and 309 have their polarization axes mechanically oriented to adjacent delay lines by about forty-five degrees. In essence, the VPPs are just PSs whose actuators function to position an incident light signal at a phase angle of zero degrees or one-hundred eighty degrees with respect to an adjacent delay line. When a given actuator is 'off', an associated VPP has a phase angle of zero degrees. When a given actuator is turned 'on', an associated VPP has a phase angle of one-hundred eighty degrees. One of ordinary skill in the art will appreciate that, as operated, each VPP is optically equivalent to a half-wave plate when at the one-hundred eighty degree phase shift position.

The total delay of VDS 300 is varied by switching VPP1 and VPP2 either 'on' or 'off'. In the 'off' position, a given VPP does not rotate the polarization state and the delay of a subsequent delay line is added to that of the preceding one. In the 'on' position, a VPP acts as a horizontal to vertical polarization transformer, by achieving an one-hundred eighty degree phase shift. This causes the delay of the subsequent PM sections to be essentially subtracted from that of the previous section(s). That is, the delay of the subsequent PM sections are added to the other principal state of polarization. In combination with an appropriate real-time detection and control system, the present invention can be used for first-order PMD compensation in optical fiber communication systems that operate at ten gigabytes per second or more.

As discussed above, the delay lines can take on virtually any value. For example, a VDS 300 can include a number of delay lines where each subsequent delay line provides twice the time delay of an immediately prior delay line. A VDS 300 so constructed provides a PMD compensator with a resolution of 'L', a minimum amount of delay of 'L' and adjustable steps of 'L' up to a maximum of $((2^N-1) * L)$ units of delay, where 'N' is the number of stages. For example, if 'L' is four picoseconds, five delay sections of L, 2L, 4L, 8L and 16L, provide a delay of four, eight, sixteen, thirty-two and sixty-four picoseconds, which allows for the compensation of up to one-hundred twenty-four picoseconds of DGD.

Figure 4:
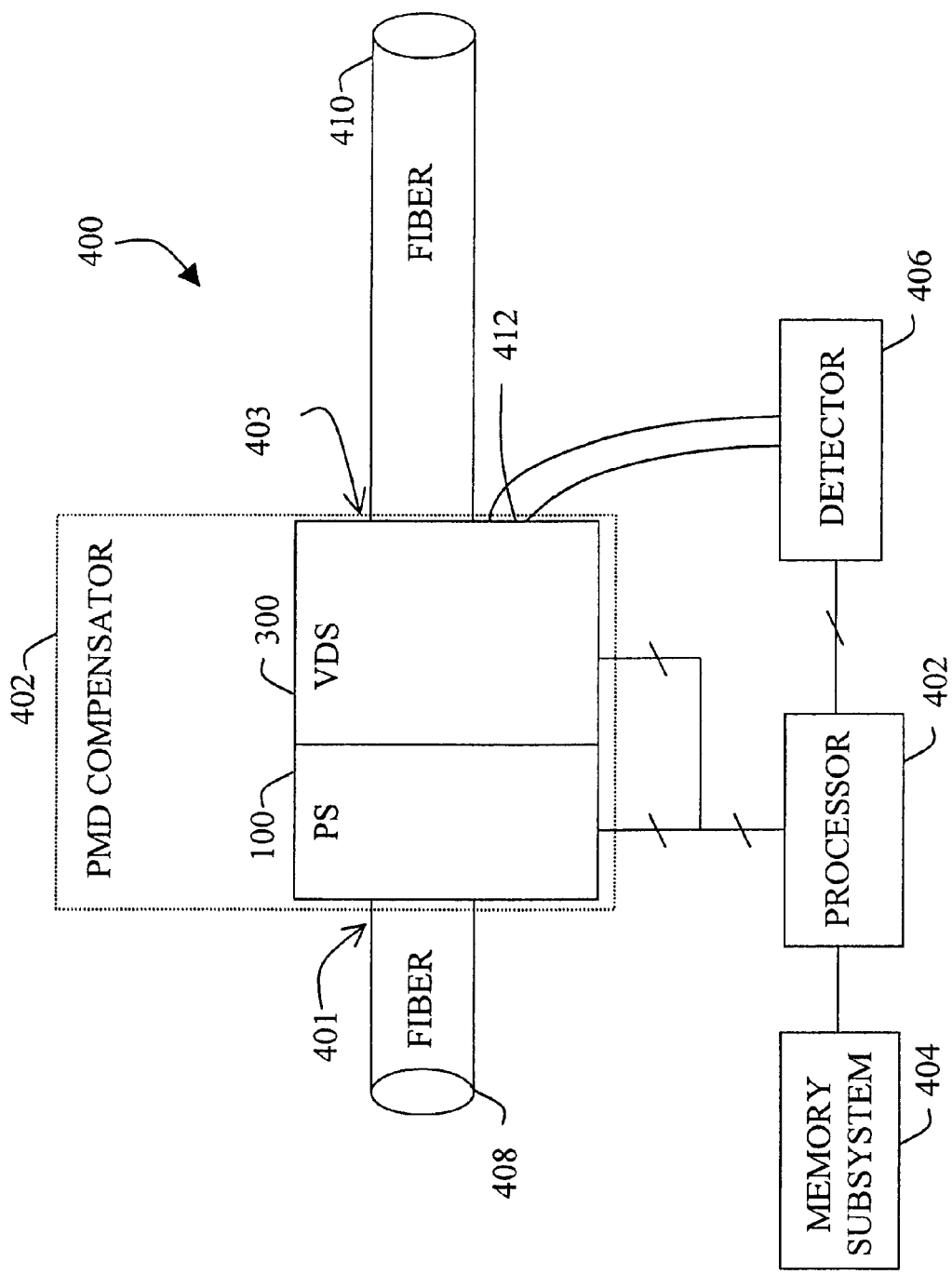
FIG. 4 is a block diagram of a real-time detection and feedback control system incorporating a PMD compensator, configured according to FIGS. 1 and 3.

FIG. 4 depicts a closed-loop feedback control system 400. A PMD compensator 402, according to the present invention, includes a phase shifter (PS) 100 (FIG. 1) that is utilized in conjunction with a variable delay section (VDS) 300 (FIG. 3). PS 100 functions to align the principal states of polarization (PSP) of an input optical signal with the PSP of VDS 300. System 400 includes a processor 402 that is coupled to a memory subsystem 404, a PMD detector 406 and PMD compensator 402. In this context, the term processor may include a general purpose processor, a microcontroller (i.e., an execution unit with memory, etc., integrated within a single integrated circuit) or a digital signal processor.

An optical device 408 (e.g., a single-mode optical fiber) that may experience PMD is coupled to an input 401 of the PMD compensator 402. An output 403 of the PMD compensator 402 provides a compensated optical signal to optical fiber 410. Detector 406 is coupled to the output 403 of the PMD compensator 402, through a tap 412 (e.g., an optical splitter/coupler), such that it receives a portion (e.g., thirty percent) of the compensated optical signal.

Detector 406 functions to reconstruct the power spectrum (i.e., performs an optical autocorrelation function) at selected points (e.g., 2.5 GHz, 5.0 GHz and 7.5 GHz). The outputs at the selected points are low-pass filtered (e.g., using a 300 kHz LP filter) to provide DC voltages. The amount of PMD that the compensated optical signal, exiting the PMD compensator 402, is experiencing can be determined from the DC voltages. The output of the detector 406 is provided to processor 402, which, in response to the output from detector 406, desirably controls compensator 402 (i.e., the piezoelectric actuators of the compensator) to lower the amount of PMD of the compensated optical signal. A suitable PMD detector is described in a note by D. Sandel, M. Yoshida-Dierolf, R. Noé, A. Schöpflin, E. Gottwald and G. Fischer, entitled "Automatic Polarization Mode Dispersion Compensation in 40 Gbit/s Optical Transmission System," Electronics Letters, 1998, Vol. 34, No. 23, pp. 2258–2259, which is hereby incorporated by reference.

Memory subsystem 404 includes an application appropriate amount of volatile and non-volatile memory that contains a software routine for controlling PMD compensator 402, according to the amount of PMD exhibited by the compensated optical signal at the output 403 of the PMD compensator 402. As mentioned above, this is achieved by controlling the mechanical squeezers (e.g., piezoelectric actuators) of PS 100 and VDS 300, according to the software routine stored within memory subsystem 404. Preferably, the piezoelectric actuators have a response time typically much less than one millisecond. Suitable piezoelectric actuators are manufactured and made commercially available by Token Corp. of Japan (part no. ASB090CB01WP1-A1).

In summary, an embodiment of the present invention provides a practical all fiber first-order PMD compensator. The PMD compensator is based on commercially available components, such as, PM fibers and mechanical squeezers (e.g., piezoelectric actuators). The all fiber PMD compensator is relatively insensitive to component misalignment or calibration errors, when the control loop utilizes a feedback configuration. In the preferred embodiment, the present invention advantageously has no rotating parts, which allows the present invention to provide a relatively fast practical solution to first-order PMD, in single-mode optical fibers. A highly reliable PMD compensator can be achieved when the PM fibers of the phase shifters and the variable phase plates utilize durable polymer or metalized optical fiber coatings. In certain implementations, it may be advantageous to embed the PM fibers within a polymer. The high reliability of the PMD compensator is due, in part, to the fact that there are no mechanically rotating elements that require maintenance.

It will become apparent to those skilled in the art that various modifications to the preferred embodiment of the invention as described herein can be made without departing from the spirit or scope of the invention as defined by the appended claims.

What is claimed is:

1. A polarization mode dispersion compensator for correcting polarization mode dispersion in an optical signal, the optical signal having principle states of polarization, the polarization mode dispersion compensator comprising:

a phase shifter to rotate the principal states of polarization of the optical signal to a desired orientation, the phase shifter including a plurality of optical fiber segments, and a plurality of fiber-squeezing elements to each selectively impart a force on a corresponding one of the plurality of optical fiber segments, wherein each of the plurality of optical fiber segments is a polarization-maintaining optical fiber defining a fast axis, the plurality of optical fiber segments being spliced together in series such that the fast axis of each of the plurality of optical fiber segments is not aligned with the fast axis of an adjacent one of the plurality of optical fiber segments; and a variable delay section coupled to the phase shifter to impart a desired delay to at least a portion of the optical signal to compensate for the polarization mode dispersion.

2. The polarization mode dispersion compensator of claim 1 wherein the fiber-squeezing elements are piezoelectric actuators.

3. The polarization mode dispersion compensator of claim 1 wherein the number of the plurality of optical fiber segments and the plurality of fiber-squeezing elements in the phase shifter is at least three.

* * * * *